US008456167B2

(12) United States Patent
Key

(10) Patent No.: US 8,456,167 B2
(45) Date of Patent: Jun. 4, 2013

(54) IONISATION VACUUM GAUGES AND GAUGE HEADS

(75) Inventor: Matthew Key, Pevensey (GB)

(73) Assignee: Edwards Limited, Crawley, West Sussex (GB)

(*) Notice: Subject to any disclaimer, the term of this patent is extended or adjusted under 35 U.S.C. 154(b) by 349 days.

(21) Appl. No.: 12/742,426

(22) PCT Filed: Oct. 7, 2008

(86) PCT No.: PCT/GB2008/050913
§ 371 (c)(1),
(2), (4) Date: May 25, 2010

(87) PCT Pub. No.: WO2009/063233
PCT Pub. Date: May 22, 2009

(65) Prior Publication Data

US 2011/0101988 A1 May 5, 2011

(30) Foreign Application Priority Data

Nov. 12, 2007 (GB) .................................. 0722063.5

(51) Int. Cl.
*G01L 21/30* (2006.01)
*G01L 21/34* (2006.01)

(52) U.S. Cl.
USPC ........................................... 324/460; 324/463

(58) Field of Classification Search
USPC ................................................. 324/460, 463
See application file for complete search history.

(56) References Cited

U.S. PATENT DOCUMENTS

| | | | | |
|---|---|---|---|---|
| 3,872,377 | A * | 3/1975 | Kageyama et al. | 324/463 |
| 4,847,564 | A | 7/1989 | Limp | |
| 5,157,333 | A | 10/1992 | Peacock et al. | |
| 5,198,772 | A | 3/1993 | Peacock et al. | |
| 6,474,171 | B1 | 11/2002 | Holme et al. | |
| 6,734,782 | B2 * | 5/2004 | Kautz et al. | 337/333 |

FOREIGN PATENT DOCUMENTS

| | | | | |
|---|---|---|---|---|
| DE | 30 47 744 | A1 | 7/1982 | |
| GB | 2 255 440 | A | 11/1992 | |
| GB | 2 256 310 | A | 12/1992 | |
| JP | 61226628 | A | 4/1985 | |
| JP | 8029283 | A | 7/1994 | |
| JP | 2007-155669 | A * | 12/2005 | 324/463 |
| JP | 2007155669 | A | 12/2005 | |

OTHER PUBLICATIONS

Welch, K.M. et al; Enhanced Ignition of Cold Cathode Gauges Through the Use of Radioactive Isotopes, Journal of Vacuum Science and Technology; May 1, 1996; pp. 1228-1291; vol. 14, No. 3, Part 01, Part A, AVS/AIP, Melville, NY, US.

* cited by examiner

*Primary Examiner* — Amy He

(57) ABSTRACT

A gauge head (10) for an ionisation vacuum gauge includes an electrical device (12, 28, 54) operable to provide an electrical discharge in a gas whose pressure is to be measured to initiate ion discharge in the gas.

11 Claims, 2 Drawing Sheets

IONISATION VACUUM GAUGES AND GAUGE HEADS

FIELD OF THE INVENTION

The invention relates to ionisation vacuum gauges and gauge heads.

BACKGROUND TO THE INVENTION

Cold cathode ionisation vacuum measuring gauges, sometimes referred to as "Penning" gauges, generally comprise an anode and one (or more) cathodes with a large potential difference applied between the anode and the cathode(s) and a magnet that applies a substantial magnetic field in the area between the electrodes. The potential difference between the anode and cathode can be in the range 2 to 5 kV and the magnetic field can be generated by a permanent or non-permanent magnet. The anode and cathode(s) are held in a predetermined configuration relative to each other, which isolates the electrodes within the gauge from the atmosphere outside.

Cold cathode ionisation gauges rely for their operation on ionising the atoms and molecules of the gas whose pressure is being measured by generating a plasma within the gauge. Electrons can be emitted by the cathode(s) and accelerated towards the anode by the electric field. Collisions between the electrons and gas molecules as the electrons move towards the anode form positive ions that are attracted by the cathode(s) to produce an ion current in an external circuit. The action of the magnetic field causes the electrons to adopt a very long, non-linear, trajectory prior to striking the anode. This increases the likelihood of an electron colliding with and ionising gas molecules before it is captured by the anode. The magnitude of the ion current is related to the number density of the gas at a given temperature and therefore to the level of vacuum.

To initiate an ion discharge, some free electrons must be present within the gauge envelope; a certain number of free electrons are likely to arise due to random events. The free electrons are accelerated towards the anode by the applied potential difference. There is a probability that some will collide with residual gas molecules, producing ionisation of the molecules and the release of further electrons. The newly released electrons will be similarly accelerated and may produce further gas collisions, ions and electrons. The ions arising from electron collisions will be accelerated towards the cathode and, when they strike it may cause the release of further electrons by secondary emission processes.

For an ion discharge to be built up and sustained, the rate at which new free electrons are generated, by collisions within the gas and secondary emission, must initially exceed the rate at which electrons are captured by the anode. Unless free electrons are produced at a greater rate than the capture rate, ion discharge will fail to establish itself.

When the ion discharge is fully established it stabilises at a level such that the flows of ions and electrons to the cathode and anode respectively reach a value, which is dependent on the number density of gas molecules within the discharge chamber of the gauge. Hence the suitability of the ion current as a measure of the gas pressure.

When a cold cathode ionisation vacuum gauge is switched on at a very low pressures, for example less than $1\times10^{-5}$ mbar, it may fail to "strike" (i.e. an ion discharge may fail to establish) for a considerable time. At low pressures the chance of randomly occurring free electrons is reduced, as is the chance of such electrons making numerous collisions with residual gas molecules. The result is the gauge may take several minutes or even hours to strike because the probability of an ionising event occurring is reduced due to low gas density. This problem may be accentuated if, in service, the electrode structure becomes coated with contaminating layers. Contaminating layers can build up in gauges used in industrial high vacuum systems where many sources of contamination, including organic vapours, enter the gauge head from the pumping system. Contaminant layers formed by adsorption onto the electrode surfaces may affect their secondary emission characteristics and can be particularly effective in inhibiting the proper establishment of ion discharge when the gauge is switched on.

SUMMARY OF THE INVENTION

The invention provides a gauge head for a cold cathode ionisation vacuum gauge, said gauge head comprising an electrical device operable to provide an electrical discharge in a gas whose pressure is to be measured for initiating ion discharge in said gas.

The invention also includes a gauge head for an ionisation vacuum gauge, said gauge head comprising electrical discharge means operable to initiate an ion discharge in a gas whose pressure is to be measured by providing an electrical discharge in said gas.

The invention also includes a cold cathode ionisation vacuum measuring gauge comprising a gauge head as defined in either of the last two preceding paragraphs.

The invention also includes a method of operating a cold cathode ionisation vacuum gauge, said method comprising receiving a gas whose pressure is to be measured and initiating ionisation in said gas by providing an electrical discharge in said gas.

BRIEF DESCRIPTION OF THE DRAWINGS

In order that the invention may be well understood, an embodiment thereof, which is given by way of example only, will now be described with reference to the drawings in which.

DETAILED DESCRIPTION OF THE ILLUSTRATED EMBODIMENT

Figure 1:
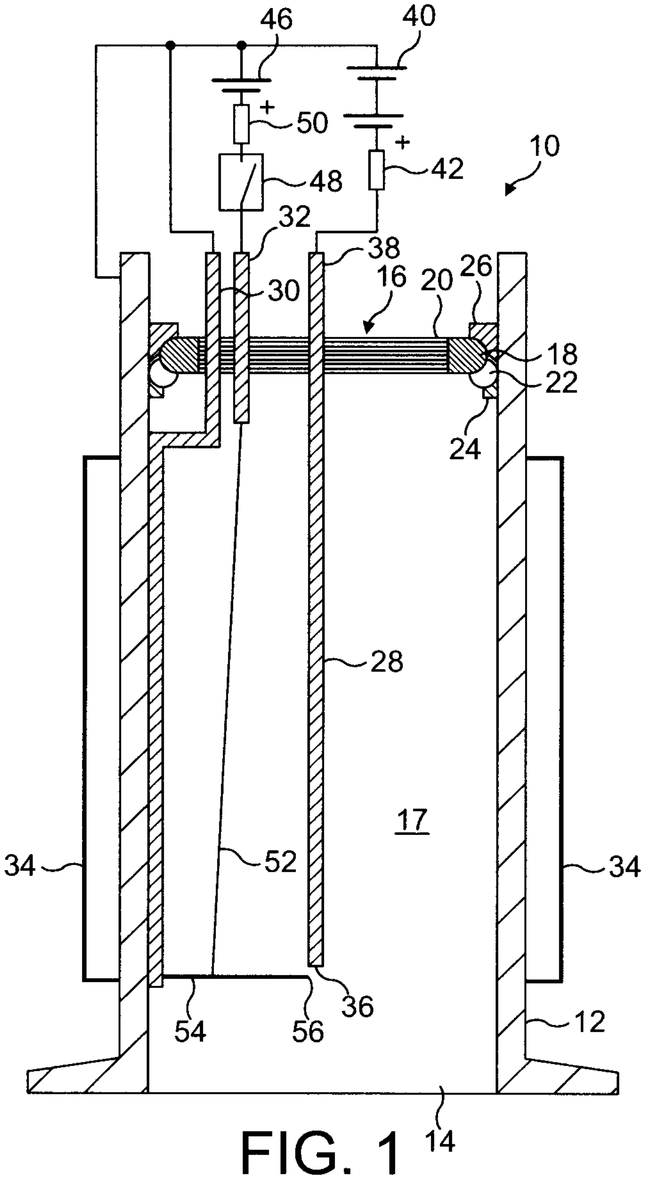
FIG. 1 is a schematic illustration of an ionisation vacuum gauge head.

Referring to FIG. 1, a cold cathode vacuum gauge head 10 comprises a gauge tube 12, which has an open end 14 configured to be joined in flow communication with equipment that is to be evacuated and from which the gas pressure is to be measured. Typically, although not always, the gauge tube 12 houses a plurality of cathode cups such as in an inverted magnetron arrangement known to those skilled in the art. For ease of representation, no cathode cups are shown in FIG. 1 and the gauge tube 12 forms or is integral with the cathode.

The end of the gauge tube 12 opposite the open end 14 is sealingly closed by a vacuum feedthrough 16. The space within the gauge tube 12 between the open end 14 and the vacuum feedthrough 16 functions as a gas receiving area (or discharge chamber) 17 that is sealed from the external environment when the open end is joined to a piece of equipment that is to be evacuated.

The vacuum feedthrough 16 comprises an annular body 18 that is closed by a sealing plug 20. The annular body 18 seats on an O-ring 22, which in turn seats on an annular ledge 24 provided within the gauge tube 12. In FIG. 1 the ledge 24 is shown as integral with the gauge tube 12. However, it may be a separate part fitted to the gauge tube. A suitable securing device 26 locates and secures the annular body 18 against the O-ring 22. An anode 28 and electrical feedthroughs 30, 32 extend through the sealing plug 20, which may be an insulating glass bead. The sealing plug 20 seals between annular body 18 and the anode 28 and electrical feedthroughs 30, 32. The sealing plug 20 additionally provides electrical insulation between the cathode and anode.

The gauge tube 12 is surrounded by an annular magnet 34, which may be permanent or non-permanent. The magnet 34 applies a significant magnetic field within the gauge tube 12. The effect of the magnetic field is to cause electrons travelling from the cathode (gauge tube 12) to the anode 28 to travel in spiral paths. This thus causes the electrons to travel for far longer distances in the interior of the discharge chamber 17, before being captured by the anode, than would be the case if the electrons travelled merely radially, as they would in the absence of the magnetic field. This considerable extension to the length of the path of the electrons increases significantly the chances that an electron will hit and ionise a gas molecule before capture by the anode.

The anode 28, which may, for example, be a stainless steel rod, is disposed coaxial with the gauge tube 12 and has a free end 36 disposed in the region of the open end 14 of the gauge tube 12. The opposite end 38 of the anode 28 is connected to a high voltage power supply 40. Optionally, a current limiting resistor 42 is provided between the anode 28 and power supply 40 to limit the current drawn from the power supply. The cathode is connected to the negative side of the power supply 40 by the electrical feedthrough 30, which can take the form of any suitable electrical conductor. The power supply arrangement is such that, in use, a high potential difference, for example between 2 and 5 kV, can be established between the anode and cathode.

The electrical feedthrough 32 is connected to an auxiliary power supply 46 via a switch 48 and an optional current limiting resistor 50. Within the discharge chamber 17, the electrical feedthrough 32 is connected to a wire 52 made of a shape memory alloy (SMA). The end of the SMA wire 52 remote from the electrical feedthrough 30 is connected to a switch arm 54, which is pivotally connected to the gauge tube 12. When the switch 48 is open so that the SMA wire 52 is not energised, the free end 56 of the switch arm 54 is spaced from the free end 36 of the anode 28. The spacing between the free end 56 of the switch arm 54 and free end 36 of the anode 28 may be in the region of 0.5 mm.

In operation, the anode 28 is normally held at a high voltage with respect to the cathode by the power supply 46. In order to initiate discharge, the free end 56 of the switch arm 54 is made to contact the free end 36 of the anode 28. This pulls the anode voltage down to the cathode voltage. By releasing the switch arm 54 so that its free end 56 lifts away from the free end 36 of the anode 28, an arc is momentarily formed between the anode and cathode. The resulting ionisation of gas molecules in the vicinity of the arc is enough to initiate plasma discharge within the gauge tube 12. Once the ion discharge is fully established, it stabilises at a level such that the flows of ions and electrons to the cathode and anode respectively reach a value that is dependent on the number and density of gas molecules within the discharge chamber 17 and the resultant ion current can be used in determining the gas pressure.

Figure 2:
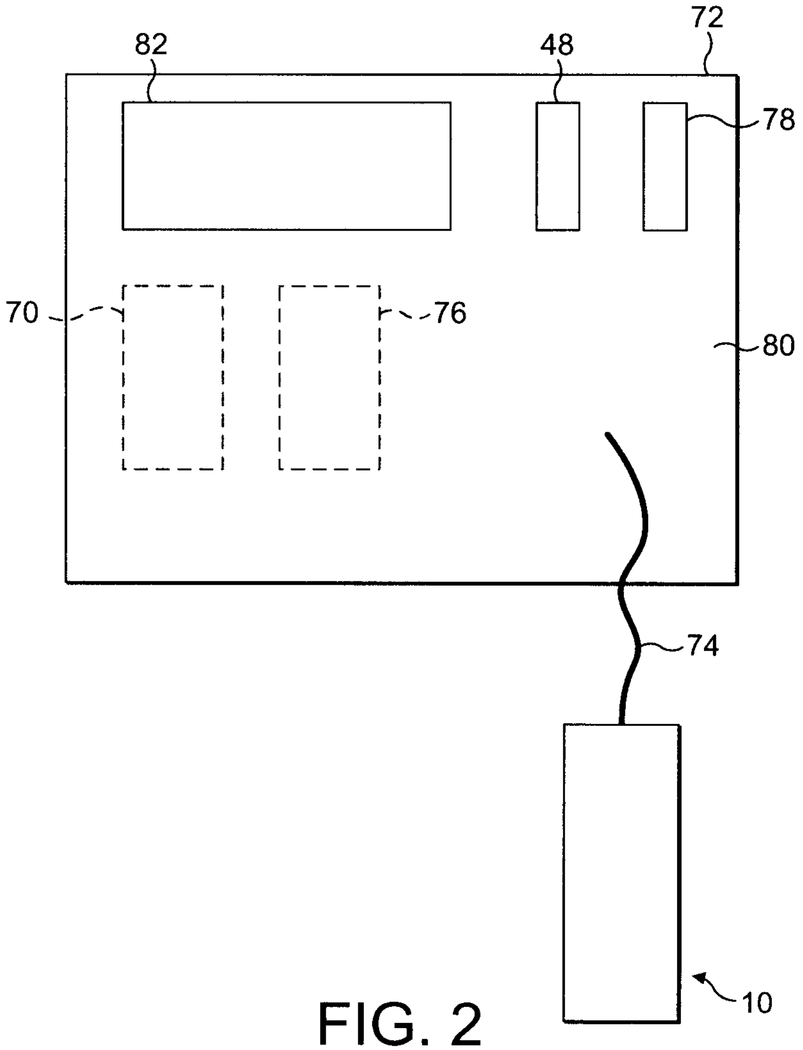
FIG. 2 is a schematic illustration of a vacuum gauge comprising the ionisation vacuum gauge head shown in FIG. 1.

Although not shown in FIG. 1, those skilled in the art will recognise that suitable equipment associated with the gauge head is provided to measure the ion current that arises as a result of the flow electrons to the cathode and using the magnitude of the current compute the gas pressure. The equipment may be provided integrally with the gauge head or, as indicated in FIG. 2, may be provided in a box, or housing 72, that is separate from the gauge head 10 and connected to the gauge head by suitable cabling 74. The housing 72 may also house the power supplies 40, 46 and current limiting resistors 42, 48 (indicated collectively in FIG. 2 at 76) and an on/off switch 78 would be mounted on a face 80 of the housing so as to be accessible to users. The housing 72 may also be provided with a display 82 on which pressure readings derived from the magnitude of the ion current are displayed. In the illustrated example, the switch 48 is mounted on the face 80 of the housing 72 adjacent the on/off switch 78.

In the embodiment illustrated by FIG. 1, movement of the switch arm 54 is controlled using the SMA wire 52. When the switch 48 is closed, a small electrical current from the auxiliary power supply 46 is applied to the SMA wire 52 via the electrical feedthrough 30 and limiting resistor 50. The applied current heats the SMA wire 52 causing it to deform such that its effective length is reduced and the free end 56 of the switch arm 54 is pulled onto the free end 36 of the anode 28. When the applied current is removed, the SMA wire 52 cools and relaxes to its initial length. As the SMA wire 52 relaxes, the electrical connection between the free end 36 of the anode and the free end 56 of the switch arm 54 is broken and arcing occurs. Known SMA technology can provide a change of approximately 10% of the total length of the wire, which allows for sufficient movement of the switch arm 54 to make and break the contact between the anode and the switching arm.

Although not essential, the SMA wire 52 and switch arm 54 can be arranged such that the motion applied to the switch arm by the wire produces a wiping action that keeps the contact surfaces of the anode and switch arm clean.

In the illustrated embodiment, the SMA wire 52 is heated by the applied current to cause it to move the switch arm 54 into contact with the anode 28. When the applied current is removed, the SMA wire cools, resumes its original shape and in so doing moves the switch arm away from the anode. Since a vacuum thermally insulates the SMA wire, disconnection of the switch arm 54 from the anode 28 may be delayed because the SMA wire cools relatively slowly. Generally, such a delay is not consequential. However, if such a delay is undesirable, mechanisms can be provided for which the reverse occurs and it is the heat from the applied current that causes disconnection of the anode and switch arm. It will also be appreciated that a biasing device, such as a spring, may be used to assist in a movement of the switch arm.

It will be understood that switching actuators other than a member made of a SMA alloy can be used. For example, a bimetallic strip or a solenoid actuator might be used. In either case, the actuator can be arranged, possibly in conjunction with an associated linkage and/or cam arrangement, to provide a relative wiping movement between the switching and the anode.

It will be understood that, although, it may be convenient to use switching associated with the anode/cathode structure of the gauge head to provide the electrical discharge, this is not essential and, instead, separate, dedicated, electrical circuitry could be provided.

In the illustrated embodiment, the switch arm 54 contacts the free end of the anode. This is not essential and it will be appreciated that contact may be made at any convenient location on the anode.

As will be known by those skilled in the art, where cathode cups are used, the cups are often arranged in line so as to define a discharge chamber that extends between the opposed end cups. Examples of gauge heads using cathode cups can be seen in GBI 535 314 and EPO 516 422, the contents of which are incorporated herein by reference. In embodiments in which the discharge chamber is defined by one or more cathode cups, the electrical discharge to initiate ionisation is preferably provided within the discharge chamber (ie internally of one or more cathode cups). An end plate of said cups may be aperture such as to allow gas to enter the discharge chamber and reduce egress of plasma from the discharge chamber. Such an apertured plate may be provided with a slot for receiving the switch arm described in relation to the illustrated embodiment.

In the illustrated embodiment, structure for providing just one electrical discharge is shown. It will be understood that if desired, the gauge head may be provided with circuitry for providing more than one electrical discharge at spaced locations within the gauge head.

It will be appreciated that even when measuring high degrees of vacuum at which there may be insufficient free electrons to give rise to a sufficient number of ionising collisions for a conventional ionising vacuum gauge to start indicating properly, the gauge head of the illustrated embodiment provides the possibility of quick "starting" of the gauge by providing sufficient charged particles to initiate the required ionising collisions.

It will be appreciated that the inventive concepts disclosed herein while not limited to use in such gauges are applicable to so-called Penning gauges and magnetron gauges.

The invention claimed is:

1. A gauge head for a cold cathode ionisation vacuum gauge, said gauge head comprising an anode, and an electrical device operable to provide an electrical discharge in a gas whose pressure is to be measured for initiating ion discharge in said gas, wherein said electrical device comprises a switch member moveable between a switch closed position and a switch open position, said electrical discharge being caused by movement of said switch member from said closed to said open position, and wherein said switch member is in contact with said anode when is said switch closed position and said electrical discharge is provided by moving said switch member from said switch closed position in which it is in contact with the anode to said switch open position at which the switch member is not in contact with the anode.

2. The gauge head for a cold cathode ionisation vacuum gauge as claimed in claim 1, comprising a body that defines a gas receiving region in which said gas whose pressure is to be measured is received, said electrical device being arranged to provide said electrical discharge in said gas receiving region.

3. The gauge head for a cold cathode ionisation vacuum gauge as claimed in claim 1, comprising a cathode and wherein said switch member is mounted so as to be electrically connected to said cathode.

4. The gauge head for a cold cathode ionisation vacuum gauge as claimed in claim 1, wherein said switch member is a pivotally mounted arm.

5. The gauge head for a cold cathode ionisation vacuum gauge as claimed in claim 1, wherein said electrical device includes an actuator for said switch member, said actuator comprising an actuating member that changes shape in response to an electrical input.

6. The gauge head for a cold cathode ionisation vacuum gauge as claimed in claim 5, wherein at least a portion of said actuating member is made of a shape memory alloy.

7. The gauge head for a cold cathode ionisation vacuum gauge as claimed in claim 1, wherein when moving between said switch open and switch closed positions, said switch member wipes a surface it contacts when in said switch closed position.

8. A gauge head for a cold cathode ionisation vacuum gauge, said gauge head comprising an anode, and electrical discharge means operable to initiate an ion discharge in a gas whose pressure is to be measured by providing an electrical discharge in said gas, wherein said electrical discharge means comprises a switch member moveable between a switch closed position and a switch open position, said electrical discharge being caused by movement of said switch member from said closed to said open position, and wherein said switch member is in contact with said anode when in said switch closed position and said electrical discharge is provided by moving said switch member from said switch closed position in which it is in contact with the anode to said switch open position at which the switch member is not in contact with the anode.

9. The gauge head for a cold cathode ionisation vacuum gauge as claimed in claim 8, comprising means defining a discharge chamber in which said gas is received, said electrical discharge means being arranged to provide said electrical discharge in said discharge chamber.

10. The gauge head for a cold cathode ionisation vacuum gauge as claimed in claim 8, wherein said switch member is controllably deformable to actuate said electrical discharge, said switch member being deformable by application of heat.

11. The gauge head for a cold cathode ionisation vacuum gauge as claimed in claim 10, wherein said switch member is made of a shape memory alloy.

* * * * *